United States Patent Office 2,922,991
Patented Jan. 26, 1960

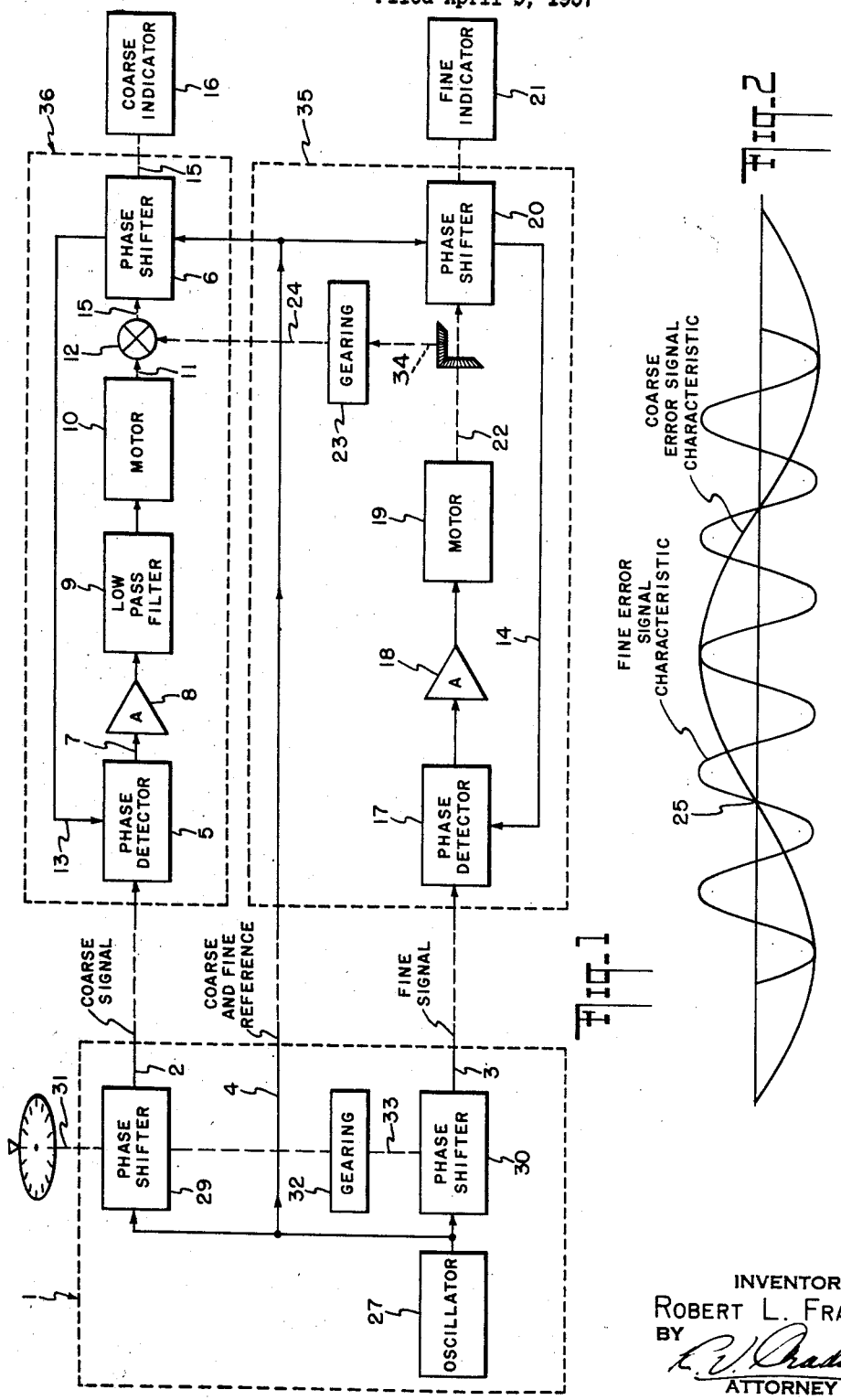

2,922,991

PLURAL SPEED DATA RECEIVER

Robert L. Frank, Great Neck, N.Y., assignor to Sperry Rand Corporation, a corporation of Delaware Application April 9, 1957, Serial No. 651,671

6 Claims. (Cl. 340—187)

The invention relates generally to receivers for use in plural speed data transmission systems, and more particularly, to means for enhancing the dynamic response of such receivers under conditions of high rate of change of data.

Data transmission systems are well known in the art for causing, for example, a plurality of driven shafts at the data receiver to be positioned in accordance with the displacements of a control shaft at the data transmitter. The receivers for use in such data transmission systems incorporate more than one data follower such as a servomechanism, each servomechanism driving a respective shaft at different but predetermined rates of speed, the position of the lowest speed shaft corresponding to coarse data while the position of the highest speed shaft corresponds to fine data. The function of the coarse data is to remove the ambiguity inherent in the fine data as reproduced by the data receiver.

For example, as in a well known 36:1 dual speed transmission system, each single complete rotation of the control shaft at the transmitter will produce one complete revolution of the coarse shaft and thirty-six complete revolutions of the fine shaft at the receiver. In a manner analogous to the fashion in which the minute and hour hand indications of a clock are interpreted, the position of the coarse shaft in degrees, for example, is combined with the position of the fine shaft in degrees in order to produce a final reading having the precision of the fine shaft displacement but having the ambiguity resolution property of the coarse shaft.

Each of the coarse and fine receiver data reproducers are in themselves independent devices and are commonly of the null-seeking type. Inasmuch as a predetermined plurality of rotations of the fine shaft correspond to a single rotation of the coarse shaft, the gradient of the coarse error signal about its null is low relative to the gradient of the fine error signal about its corresponding null. It is because of this difference in error gradients that the coarse servomechanism inherently suffers the following two disadvantages not shared to the same degree by the fine servomechanism: (1) dynamic response, i.e., the ability to follow changing data, is less; and (2) susceptibility to random variations in the coarse data signal is greater, whereby erroneous coarse data indications may result.

One of the techniques employed in the art for minimizing the undesirable susceptibility of the coarse servomechanism to noise (i.e., random variations in the coarse data signal) is to introduce integrating or filtering means in the coarse servomechanism error signal channel whereby the data signal fluctuations caused by the presence of noise are to some extent minimized by an averaging process. Although the sensitivity of the coarse servomechanism to noise is decreased by the introduction of such filtering means, the inherent slower dynamic response of the coarse servomechanism is further aggravated thereby.

It is the principal object of the present invention, in a plural speed data receiver, to reduce the dynamic lag of the coarser data indicators to that of the most precise data indicator.

Another object of the present invention is to maintain the dynamic response characteristic of a plural speed data receiver despite the introduction of means to render the receiver coarser data reproducers less susceptible to the presence of noise.

An additional object of the present invention is to provide a dual speed data receiver wherein the coarse data indicator is jointly driven by coarse and fine servomechanisms and wherein the fine data indicator is solely driven by the fine servomechanism.

Yet another object of the present invention is to provide a dual speed data receiver wherein the coarse indicator is solely driven by a coarse servomechanism under static data conditions but wherein the coarse indicator is jointly driven by the coarse and a fine servomechanism under dynamic data conditions.

These and other objects of the present invention, as will appear from the following description, are accomplished in an illustrative embodiment of a dual speed data transmission system by the provision of independent receiver coarse and fine data servomechanisms. The fine data indicator is driven solely by the fine servomechanism. Differential means are provided for driving the coarse indicator jointly by means of the coarse and fine servomechanisms. The total data is read by combining the coarse and fine data indications.

For a more complete understanding of the present invention, reference should be had to the following description and the appended drawings of which Fig. 1 is an illustrative dual speed data transmission system embodiment of the present invention wherein data is transmitted in the form of the phase of coarse and fine control signals; and Fig. 2 is a diagram of superimposed error signal characteristics of coarse and fine data receiver servomechanisms of the null-seeking type such as shown in Fig. 1.

In Fig. 1, a data source for a dual speed data transmission system is generally represented by the numeral 1. By way of example, the system of Fig. 1 is arbitrarily chosen to be of a phase sensitive type wherein data is communicated in form of the phase of coarse and fine control signals. Accordingly, the components contained within data source 1 are arranged to provide three A.C. output signals, appearing on conductors 2, 3, and 4, which are utilized in different pairs, respectively, by the coarse and fine servomechanisms 36 and 35 embodied in the receiver portion of the apparatus of Fig. 1.

Oscillator 27 produces a signal at a convenient frequency for application to the electrical inputs of phase shifters 29, 30, 6 and 20. Phase shifters 29, 30, 6 and 20 each may be in the form of a resolver and phase shifting network having an electrical input and providing an electrical output whose phase, relative to that of the input, is determined by a function of the angular displacement of its resolver rotor. The rotor of phase shifter 29 is manually positionable by means of shaft 31, which shaft is also coupled to the input of gearing 32. Gearing 32 produces a predetermined ratio between the mechanical displacements of its input and output shafts which establishes the relationship between the periodicity of the coarse and fine data signals as is well known in the art. The output of gearing 32 mechanically displaces the rotor of phase shifter 30 by means of shaft 33. Thus, there is produced on line 2 and alternating signal at the frequency of oscillator 27 having a phase relative thereto as determined by a function of the angular displacement of shaft 31. Similarly, there is produced on line 3 a signal at the same frequency as that of oscillator 27 but having a phase relative thereto as determined by the same function of the angular displacement of shaft 33. The signal appearing on line 4 is utilized as a reference signal for the coarse servo-mechanism 36 while the phase shifted signal on line 2 is utilized as a control signal. In a similar manner, the signal appearing on line 4 is also used as a reference signal for the fine servomechanism 35 while the phase shifted signal on line 3 is employed as the control signal.

The coarse control voltage appearing on line 2 is applied to a first input of phase detector 5 whose second input is derived from the output of phase shifter 6 via line 13. In a well known manner, phase detector 5, which is assumed to contain low pass filtering means, will produce at its output a D.C. signal whose amplitude is proportional to the cosine of the phase angle between the signals applied via lines 13 and 2. The resultant D.C. signal, appearing on line 7, is amplified as by amplifier 8 and applied to D.C. motor 10 via low pass filter 9, the purpose of which will appear later. D.C. motor 10 will rotate at a speed determined by the amplitude of the applied D.C. error signal and in a direction determined by the polarity thereof. Motor 10 drives shaft 11 which in turn positions the rotor 15 of phase shifter 6 by means of differential 12. The displacement of shaft 15 of phase shifter 6 is indicated by coarse indicator 16.

The fine control signal, appearing on line 3, is applied to a first input of phase detector 17, which may take the same form as phase detector 5. The second input of phase detector 17 is derived from the output of phase shifter 20 via line 14. In a fashion similar to that described in connection with the coarse servomechanism, phase detector 17 will produce a D.C. output having an amplitude proportional to the cosine of the phase angle between the signals appearing on lines 3 and 14 and having a polarity determined by the quadrant in which said angle lies. The resultant D.C. error signal is amplified by amplifier 18 and applied to D.C. motor 19 whose shaft 22 positions the rotor of phase shifter 20. The displacement of shaft 22 is shown on fine indicator 21.

In operation, the rotor of phase shifter 6 is driven to such a position by motor 10 that the phase of the signal appearing on line 13 is placed in quadrature with the phase of the signal appearing on line 2. As is well known, when such a phase relationship exists at the inputs to a phase detector, a zero output signal will be produced. Thus, the coarse servomechanism is of a null-seeking type. The operation of the fine servomechanism precisely parallels this.

The apparatus so far described will function as follows. For a given angular displacement of input control shaft 31, output shaft 15 of coarse servomechanism 36 will be displaced an equal number of degrees. The corresponding displacement of output shaft 22 of fine servomechanism 35 will be a multiple of the angular displacement of control shaft 31 as determined by the ratio produced by gearing 32. Assuming that a fixed displacement is imparted to input control shaft 31, coarse shaft 15 and fine shaft 22 will ultimately assume rest positions which will be displayed in appropriate units by the respective indicators 16 and 21. In a fashion directly analogous to the manner in which time is determined by combining the indications produced by the hour and minute hands of a clock, the position of input shaft 31 is ascertained by combining the presentations of indicators 16 and 21.

Fig. 2 illustrates the superimposed error signal characteristics of coarse and fine servomechanisms such as shown in Fig. 2. A 5:1 coarse-to-fine ratio is used as an example. Upon examination of Fig. 2, it can be seen that for a given deviation from their respective nulls, the amplitude of the fine error signal will be much greater than the corresponding amplitude of the coarse error signal. Inasmuch as motors 10 and 19 must drive predetermined loads presented by friction and mechanical inertia, for example, a predetermined amplitude of error signal is required to produce a predetermined rate of rotation of said motors. It can be seen that because of the difference in error signal gradients about their corresponding nulls, the coarse servomechanism must lag the fine servomechanism in order to produce the same amplitude of error signal. In other words, under conditions of rate of change of input data (corresponding to continued rotation of input shaft 31), indicator 16 will tend to lag indicator 21.

The present invention substantially eliminates the relative lag of the coarse data indicator in the dynamic mode of operation by the addition of gearing 23 and differential 12 to the structure of Fig. 1 previously described. Referring to Fig. 1, gearing 23 produces the same ratio as that produced by gearing 32 between its input shaft 34 and its output shaft 24. Input shaft 34 is driven by shaft 22 of motor 19 while output shaft 24 is applied to a second input of differential 12 whose first input, as previously described, is obtained from shaft 11. Thus, coarse indicator 16 is connected jointly to fine servomechanism shaft 22 (via gearing 23) and coarse servomechanism shaft 11, whereas fine indicator 21 is connected solely to fine servomechanism shaft 22. The displacement ratio produced by gearing 23 serves to transform or reference the displacement of fine shaft 22 in terms of the displacement of coarse shaft 11 for any given movement of input shaft 31.

It will be observed, however, that under dynamic data conditions, coarse indicator 16 will be driven solely by fine servomechanism shaft 22. As previously discussed, shaft 22 will follow changes in the position of shaft 31 more rapidly than will shaft 11. For this reason, whatever changes are necessary in the displacement of shaft 15 of phase shifter 6, so as to maintain a quadrature phase relationship between the signals appearing on lines 13 and 2, will be imparted by the faster responding shaft 22. In other words, output shaft 11 of the coarse servomechanism will remain at rest during the application of a changing displacement of shaft 31.

As previously mentioned, the relatively low error signal gradient about the null of the coarse servo, in addition to giving rise to a lag under dynamic data conditions, will also render the coarse servo more susceptible to noise. Low pass filter 9 has been inserted in the error signal path of coarse servo 36 as a means for averaging out random fluctuations attributable to noise. It should be observed, however, that the improved response of the coarse servo 36, accomplished by the differential coarse and fine servo drive of shaft 15, is not adversely affected thereby. Inasmuch as shaft 15 is driven substantially alone by the fine servo under dynamic data conditions, the amount of filtering introduced in the coarse servo error signal path does not influence the dynamic response of the coarse servo.

Although coarse indicator 16 is driven with the dynamic precision of fine servomechanism shaft 22, the data displayed by fine indicator 21 is nevertheless indispensable in order to produce a total reading having highest precision. This is so because any quiescent static error in the position of coarse servomechanism shaft 11 will remain in the reading of indicator 16. Coarse indicator 16 may be read only to the degree of precision necessary to remove the ambiguity inherent in the indication of fine indicator 21 whereupon fine indicator 21 is referred to for a final precision reading.

It can be seen from the preceding specification that the objects of the present invention have been achieved in an illustrative embodiment by the provision of a dual speed data transmission system including coarse and fine data servomechanisms for driving respective coarse and fine data indicators. According to the present invention, the fine data indicator is driven solely by the fine servomechanism whereas the coarse data indicator is jointly driven thereby. The total data received is read by combining the coarse and fine indications.

It will be observed that although mechanical summing means, such as differential 12, is shown in the illustrative embodiment of Fig. 1, the invention also contemplates the electrical summation of the coarse and fine data signals for purposes of jointly controlling a single driven device particularly in cases wherein the coarse and fine data signals, as reproduced by the data receiver, are in the form of electrical signals rather than mechanical signals as shown in Fig. 1.

Moreover, the present invention is not limited to application to coarse and fine data receivers of a phase measuring type but is readily adaptable to other conventional types such as are responsive to other characteristics of input data signals such as, for example, to the amplitude and polarity of electrical signals.

Additionally, it will be clear that the present invention is readily applicable to multi-speed communication receivers wherein one or more of the coarser data indicators are individually driven by the combined output of a respective coarser data servo and the output of the finest data servo.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In a plural speed data receiver, first and second means adapted to receive data in the form of respective input signals having a common characteristic and operative to reproduce said data in the form of first and second output signals, said characteristic of one of said respective input signals bearing a predetermined relationship with respect to the same characteristic of the other of said respective input signals, means for referencing said first output signal to said second output signal in accordance with said predetermined relationship, and signal summing means having two inputs, said first output signal being applied to said first input by said means for referencing, and said second output signal being applied to said second input.

2. In a plural speed data receiver, first and second means each adapted to receive data in the form of respective input signals having a common characteristic and operative to reproduce said data in the form of first and second output signals, said characteristic of one of said respective input signals bearing a predetermined relationship with respect to the same characteristic of the other of said respective input signals, first and second utilization means adapted to respond to a respective one of said output signals, means for applying said first output signal to said first utilization means, means for referencing said first output signal to said second output signal in accordance with said predetermined relationship, signal summing means having two inputs and an output, said first output signal being applied to said first input by said means for referencing, said second output signal being applied to said second input, and means connecting the output of said summing means to said second utilization means.

3. In a plural speed data receiver, first and second servo means each adapted to receive data in the form of respective input signals having a characteristic of the same qualitative but different quantitative nature, the characteristic of one of said respective input signals being related quantitatively to said characteristic of the other of said respective input signals by a predetermined ratio greater than unity, said servo means being adapted to reproduce said data in the form of first and second output signals, first and second utilization means adapted to respond to a respective one of said output signals, means for applying said first output signal to said first utilization means, means for referencing said first output signal to said second output signal in accordance with said predetermined ratio, signal summing means having two inputs and an output, said first output signal being applied to said first input by said means for referencing, said second output signal being applied to said second input, and means for connecting said output to said second utilization means.

4. In combination, first and second phase-sensitive servo means, each adapted to receive a respective control signal having an adjustable phase relative to the phase of a corresponding reference signal of the same frequency, the rate of change of phase of the control signals being mutually related by a predetermined ratio, said servo means producing respective output signals having a characteristic proportional to the phase difference between a corresponding control signal and its respective reference signal, means for referencing said first output signal to said second output signal in accordance with said predetermined ratio, and signal summing means having two inputs, said first output signal being applied to said first input by said means for referencing, said second output signal being applied to said second input.

5. In combination, first and second phase-sensitive servo means, each adapted to receive a respective control signal having an adjustable phase relative to the phase of a corresponding reference signal of the same frequency, the rate of change of phase of the control signals being mutually related by a predetermined ratio, each said servo means producing an output signal in the form of the displacements of a respective shaft, the displacement of each shaft being proportional to the phase difference between a corresponding control signal and its respective reference signal, signal summing means having two inputs, and gearing means for connecting one of the shafts to said first input, the other of the shafts being connected to said second input.

6. In combination, first and second phase-sensitive servo means, each adapted to receive a respective control signal having an adjustable phase relative to the phase of a corresponding reference signal of the same frequency, the rate of change of phase of the control signals being mutually related by a predetermined ratio, each said servo means producing an output signal in the form of the displacements of a respective shaft, the displacement of each shaft being proportional to the phase difference between a corresponding control signal and its respective reference signal, first and second utilization means adapted to respond to respective ones of the shafts, means for connecting one of the shafts to said first utilization means, mechanical differential means having two inputs and an output, gearing means for connecting said one of the shafts to said first input, the other of the shafts being connected to said second input, and means for coupling the output of said differential means to said second utilization means.

References Cited in the file of this patent

UNITED STATES PATENTS

| | | |
|---|---|---|
| 2,670,456 | Naylor | Feb. 23, 1954 |
| 2,719,940 | West | Oct. 4, 1955 |
| 2,735,971 | Roven et al. | Feb. 21, 1956 |